US008102162B2

(12) United States Patent
Moussaoui et al.

(10) Patent No.: US 8,102,162 B2
(45) Date of Patent: Jan. 24, 2012

(54) BUCK CONTROLLER HAVING INTEGRATED BOOST CONTROL AND DRIVER

(75) Inventors: Zaki Moussaoui, San Carlos, CA (US); Leigh Cormie, Mountain View, CA (US); Jun Liu, San Jose, CA (US)

(73) Assignee: Intersil Americas Inc., Milpitas, CA (US)

( * ) Notice: Subject to any disclaimer, the term of this patent is extended or adjusted under 35 U.S.C. 154(b) by 415 days.

(21) Appl. No.: 12/482,818

(22) Filed: Jun. 11, 2009

(65) Prior Publication Data
US 2010/0026263 A1  Feb. 4, 2010

Related U.S. Application Data

(60) Provisional application No. 61/084,667, filed on Jul. 30, 2008.

(51) Int. Cl.
*G05F 1/563* (2006.01)
(52) U.S. Cl. ......... 323/266; 323/222; 323/271; 323/285
(58) Field of Classification Search .................. 323/222, 323/266, 271, 282, 283, 285, 299
See application file for complete search history.

(56) References Cited

U.S. PATENT DOCUMENTS

| | | | | |
|---|---|---|---|---|
| 4,974,141 A * | 11/1990 | Severinsky et al. | ............. | 363/81 |
| 5,691,629 A * | 11/1997 | Belnap | ........................... | 323/266 |
| 5,831,418 A * | 11/1998 | Kitagawa | ..................... | 323/222 |
| 5,844,399 A * | 12/1998 | Stuart | ........................... | 323/282 |
| 6,094,036 A * | 7/2000 | Rampold | ....................... | 323/266 |
| 6,798,177 B1 * | 9/2004 | Liu et al. | ........................ | 323/222 |
| 6,937,487 B1 * | 8/2005 | Bron | .............................. | 363/60 |
| 7,078,882 B2 * | 7/2006 | Weng et al. | .................... | 323/224 |
| 2005/0099164 A1 * | 5/2005 | Yang | .............................. | 323/266 |
| 2009/0059630 A1 * | 3/2009 | Williams | ........................ | 363/60 |
| 2011/0156685 A1 * | 6/2011 | Chen et al. | ..................... | 323/284 |

* cited by examiner

*Primary Examiner* — Jeffrey Sterrett
(74) *Attorney, Agent, or Firm* — Howison & Arnott, L.L.P.

(57) ABSTRACT

An integrated circuit controller for controlling the operation of a voltage converter which includes a first comparator for comparing a voltage associated with an input of a boost converter with a threshold voltage and generating a control signal in response thereto. A second comparator compares a second voltage associated with an output of the boost converter with the threshold voltage and generates a second control signal in response thereto. Driver circuitry generates a first switching transistor drive signal and a second switching transistor drive signal. The first switching transistor drive signal is used for driving an upper gate switching transistor of a buck converter. The second switching transistor drive signal may be configured in a first mode of operation to drive a lower gate switching transistor of the buck converter and may be configured in a second mode of operation to drive a switching transistor of the boost converter. Control logic enables/disables at least a portion of the driver circuitry responsive to the control signal and the second control signal.

20 Claims, 4 Drawing Sheets

BUCK CONTROLLER HAVING INTEGRATED BOOST CONTROL AND DRIVER

CROSS-REFERENCE TO RELATED APPLICATIONS

This application claims priority from U.S. Provisional Patent Application No. 61/084,667, entitled BUCK CONTROLLER INTEGRATED WITH BOOST CONTROL AND DRIVER, filed Jul. 30, 2008, which is incorporated herein by reference.

BRIEF DESCRIPTION OF THE DRAWINGS

For a more complete understanding, reference is now made to the following description taken in conjunction with the accompanying Drawings in which.

DETAILED DESCRIPTION

Figure 1:
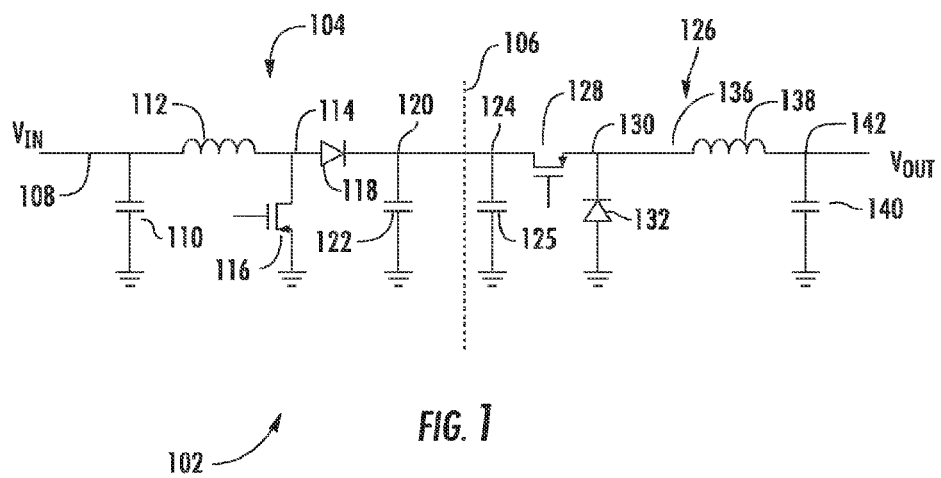
FIG. 1 is a functional block diagram of a boost regulator including an integrated boost regulator.

Referring now to the drawings, wherein like reference numbers are used herein to designate like elements throughout, the various views and embodiments of a buck controller having integrated boost control and driver are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

A buck regulator circuit includes a low-side driver for driving a low-side switching transistor and a high-side driver for driving a high-side switching transistor in various modes of operation. When operating in standard buck regulator configuration, the low-side driver circuit is not needed. Thus, some means for utilizing the low-side gate driver circuitry of the buck regulator when not being utilized would potentially improve the operation of an associated boost regulator.

The present disclosure describes an integrated circuit capable of being configured to operate as a buck mode converter and as a boost buck converter with an associated controller as described more fully herein below. When configured in the buck mode of operation, the low-side driver circuitry of the synchronous buck controller is used to drive the lower gate switching transistor of the buck converter. When in the boost buck mode of operation, the low-side driver circuitry drives the switching transistor of the boost converter and the buck converter operates in standard buck operation where no low side MOSFET drive is required. By using the low-side driver circuitry to drive the boost converter, the disclosed circuitry offers advantages to boost the input voltage applied to the buck regulator which allows the existing controller feed to be used to drive the boost converter. This further enables the DC/DC conversion system to be equivalent to a boost buck conversion. When application of the circuitry would be used with battery input DC/DC conversion when the battery voltage is low. The circuitry can be used to build a boost converter to boost the low battery voltage to a higher level and then the voltage may be regulated through the buck regulator controlled by the same integrated circuit.

Referring now to FIG. 1, there is illustrated a general schematic diagram of a boost buck converter circuit 102. The boost regulator 104 is located to the left of line 106. The input voltage $V_{IN}$ is applied to the boost regulator at node 108. A capacitor 110 is connected between node 108 and ground. An inductor 112 works in conjunction with the capacitor 110 to boost the input voltage signal $V_{IN}$. The inductor 112 is located between node 108 and node 114. A switching transistor 116 has its drain/source path connected between node 114 and ground. The boost converter switching transistor 116 is connected to receive control signals at its gate from associated control circuitry which will be more fully described herein below. A diode 118 has its anode connected to node 114 and its cathode connected to node 120. A capacitor 122 is connected between node 120 and ground. Node 120 comprises the output of the boost regulator 104 and provides an output voltage VBOOST.

The VBOOST voltage is applied from node 120 to an input node 124 of the buck regulator 126. The buck regulator 126 comprises the circuitry to the right of line 106 in FIG. 1. The buck regulator 126 includes an upper gate switching transistor 128 having its drain/source path connected between node 124 and node 130. The diode 132 has its anode connected to ground and its cathode connected to node 130. An inductor 138 and capacitor 140 act as a filter for the buck regulator 126. The inductor 138 is connected between node 130 and node 142. The capacitor 140 is connected between node 142 and ground. The node 142 comprises an output node $V_{OUT}$ of the boost buck regulator circuit. To control operation of the buck regulator 126, control signals are applied to the gate of upper gate transistor 128. Similarly, the boost regulator 104 is operated by controlling signals applied to the gate of a transistor 116. These signals comprise PWM signals generated by the control circuitry as described more fully herein below.

Figure 2:
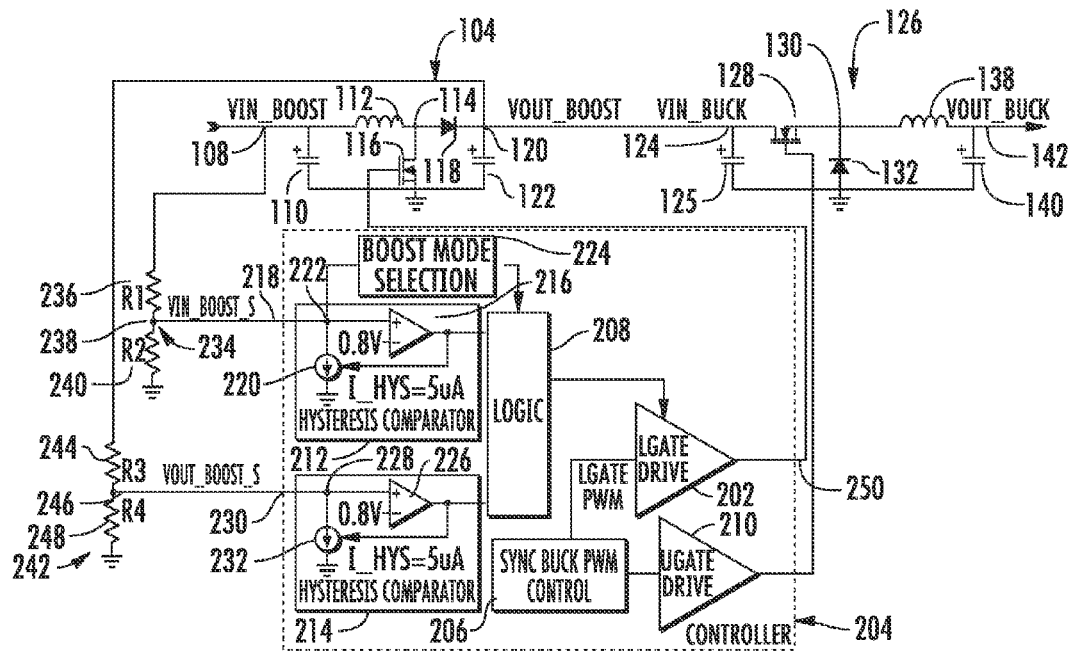
FIG. 2 is a schematic diagram illustrating the circuitry of FIG. 1 using a low-side driver to drive a boost converter within a buck regulator in a boost mode of operation.
Figure 3:
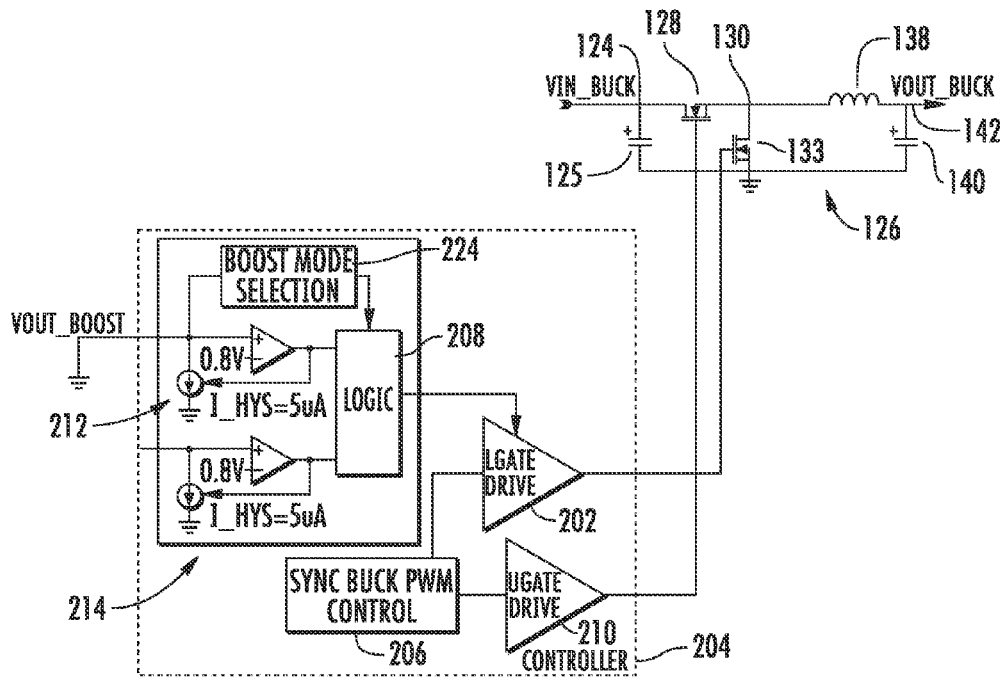
FIG. 3 is a schematic diagram illustrating the circuitry of FIG. 1 in synchronous buck mode of operation when no boost conversion is needed.

Operation of the control circuitry controlling the operation of the circuitry in the boost and buck mode configurations is more fully illustrated in FIGS. 2 and 3. Referring now to FIG. 2, there is illustrated a system diagram when the low-side driver circuitry is configured to drive the boost converter 104. The boost converter 104 receives the input voltage $V_{IN\_boost}$ at node 108. The inductor 112 is connected between nodes 108 and 114. The switching transistor 116 has its drain/source path connected between node 114 and ground. The gate of transistor 116 receives control signals from the low-side gate driver 202 within the driver control circuitry 204. The low side gate drive 202 generates a PWM control signal to the gate of transistor 116 responsive to a lower gate PWM signal provided by the synchronous buck PWM control block 206 and an enable signal provided by control logic 208. The upper gate driver 210 provides a PWM drive signal to the upper gate switching transistor 128 of the buck converter 126 that is located between node 124 and node 130. The upper gate driver 210 receives an upper gate PWM signal from the synchronous buck PWM control block 206. The control logic 208 that enables and disables the lower gate drive circuitry 202 receives control signals from a first hysteresis comparator 212 and a second hysteresis comparator 214.

The first hysteresis comparator 212 consists of a comparator 216 having its output provided as an input to the control logic 208. The non-inverting input of comparator 216 is connected with a $V_{IN\_boost}$ pin 218 of the controller driver control circuitry 204. The inverting input of the comparator 216 is connected with a 0.8 V reference voltage source. A current source 220 is connected between node 222 and ground. Node 222 provides an input to the boost mode selection block 224. The output of the boost mode selection block 224 provides a control input to the logic 208. Hysteresis comparator 214 also includes a comparator 226. The non-inverting input of comparator 226 is connected with node 228 to an output to a pin 230 of the controller 204. The output of comparator 226 is provided to control logic 208. Inverting input of comparator 226 is connected to the 0.8 V reference voltage. A second current source 232 is connected between node 228 and ground.

The hysteretic comparator 212 monitors the input voltage $V_{IN}$ through a resistor divider network 234. The resistor divider network 234 consists of a first resistor 236 connected between the input voltage node 108 and node 238. A second resistor 240 is connected between node 238 and ground. Node 238 provides the connection of the resistor divider 234 to the $V_{IN\_}$boost pin 218 of the controller 204. Through this resistor divider network 234, the controller 204 through the hysteretic comparator 212 may monitor the input voltage $V_{IN\_}$boost. A resistor 244 is connected between the output voltage node of the boost converter at node 120 ($V_{OUT\_}$boost) and node 246. A second resistor 248 of the resistor divider network 242 is connected between node 246 and ground. The second hysteresis comparator 214 monitors the boost converter output voltage through input pin 230 which is connected to node 246.

The other comparator 214 compares the sensed boost output voltage to a programmed window of hysteresis. The hysteresis comparator 214 determines when the boost controller is enabled and disabled. In the event that the boost output voltage goes higher than the programmed high threshold voltage, the boost switching is enabled. When the boost output voltage is lower than the programmed low threshold voltage, the boost switching is enabled. In this way, the boost output voltage is controlled within the desired voltage window.

The configuration of FIG. 2 uses the low-side gate driver 202 of the synchronous buck controller 204 to drive a boost controller switch 116. When the boost regulator 104 is operating, the buck regulator 126 functions as a standard buck regulator (i.e., no low-side synchronous MOSFET drive is needed). The driving signal for the switching transistor 116 within the boost converter 104 is the same driving signal that is used for driving the buck regulator low-side switching transistor 133 when the buck regulator 126 is in the synchronous buck mode of operation as is more fully illustrated in FIG. 3. The boost controller 204 monitors the input and output voltage of the boost converter 104. This configuration enables the boost converter to be used as a pre-regulator for the buck regulator circuit 126. The output of the lower gate drive 202 comprises the lower gate pin 250. The lower gate pin 250 can be used to drive the boost converter switching transistor 116. This may be used for applications when the battery voltage input to node 108 is too low and the boost converter 104 can be used to boost the battery voltage to supply the input of the buck regulator 126 that is also controlled by the controller 204.

The boost mode selection circuit 124 enables the boost logic making it active in the boost mode of operation. This allows the low-side gate driver to drive the boost mode controller switch 116 as illustrated in FIG. 2. The boost regulator 104 converts the input voltage $V_{IN}$ to a boosted output voltage $V_{OUT\_}$boost. The output is not a precisely regulated voltage but is sufficient that the voltage can be post regulated by the buck regulator 126.

The $V_{IN\_}$boost pin 218 is used to set the boost mode and monitor the battery voltage which is provided at the input of the boost converter 104. After a VCC power on reset, the controller 204 will detect the voltage at pin 218. If the voltage on pin 218 is above 800 mV, the controller 204 is set to the synchronous buck mode and latched into that mode which never changes. If the voltage on pin 218 after VCC power on reset is below 800 mV, the controller 204 is set in the boost mode of operation and is latched to this mode. In the boost mode, the low-side driver output PWM signal provided at pin 250 has the same duty cycle as upper gate driver 210 and is used for driving the boost mode controller switch 116.

By setting the resistor divider network 234, the high threshold and hysteresis of the boost converter can be programmed. When the voltage on pin 218 is above 0.8 V, the PWM output from the lower gate pin 250 is disabled, and when the voltage on pin 250 is below 0.8 V minus the hysteresis, the boost PWM signal from lower gate drive 202 is enabled. This is controlled via the enable input from control logic 208. In boost mode, the $V_{OUT\_}$boost pin 230 is used to monitor the boost converter output voltage at node 126. While the $V_{IN\_}$boost pin 218 monitors the input voltage to the boost converter.

In boost mode, pin 218 detects the input voltage through the resistor divider 234 to enable and disable the boost PWM signal provided from lower gate driver 202. By programming the resistor divider 234 connected to pin 218, the voltage threshold and hysteresis threshold window can be programmed. By connecting the battery voltage to the $V_{IN\_}$boost pin 218 through the resistor voltage divider 234, the controller 204 detects the battery voltage to enable and disable the boost converter 104. By setting the upper resistor 236 of the voltage divider 234, the hysteresis can be programmable through a five microamp sinking current provided from current source 220. When the voltage on pin 218 is lower than a low threshold, the lower gate PWM provided from the lower gate drive 202 is enabled and drives the boost converter to boost the battery voltage. At the same time, the 5 microamp sinking current from current source 220 is enabled. When the voltage on pin 218 is higher than the threshold, the lower gate PWM provided from driver 202 is disabled and the boost converter 104 stops switching. This also disables the 5 microamp sinking current from source 220.

In boost mode, the $V_{OUT\_}$boost pin 230 detects the output voltage through a resistor divider network 242 to enable and disable the boost converter 104. By programming the resistor divider 242 of the pin 230, the voltage threshold and hysteresis threshold window can be programmed. By setting the upper resistor 244 of the voltage divider 242, the hysteresis can be programmed through a 5 microamp sinking current from source 232 at pin 230. When the voltage on pin 230 is lower than the low threshold, the lower gate PWM signal provided from gate driver 202 is enabled to drive the boost PWM converter to operate to boost the battery voltage provided at node 108. At the same time, the 5 microamp sinking current from source 232 is disabled. When the voltage on pin 230 is higher than the threshold, the lower gate PWM signal provided from lower gate driver 202 is disabled and the boost converter stops switching. This also causes the 5 microamp sinking current from source 232 to be enabled.

The boosted voltage from the output of the boost converter at node 124 is provided to the input of the buck converter 126 at node 124. A capacitor 125 is connected between node 124 and ground. As described previously, the buck converter 126 consists of an upper gate switching transistor 128 connected between node 124 and node 130. In standard buck mode of operation, a diode 160 is connected between node 130 and ground in place of a lower gate switching transistor. Inductor 138 lies between node 130 and the output voltage node 142. A capacitor 140 is connected between node 142 and ground.

Referring now to FIG. 3, there is illustrated the synchronous buck mode configuration of the controller wherein no boost converter 104 is needed. In this configuration, the low-side gate driver 202 drives the low-side switching transistor 133 rather than the switching transistor 116 of the boost converter 104. The low-side switching transistor 133 is connected between node 130 and ground. Otherwise, the configuration of the buck converter circuitry remains the same as that described previously with respect to FIG. 2 other than the boost converter 104 is not included within the circuit and the input voltage is applied to the input node 124 without being boosted.

The above described circuitry can be used for a number of applications. For example, during an automotive cold crank operation, when the battery voltage is extremely low (as low as 3 volts), the boost mode selection block 124 is able to sense this low voltage and enable the boost function. Once the automotive battery has recovered from the cold crank situation, the battery voltage is now in the normal operating range (7 volts to approximately 14 volts), and the boost regulator 104 is disabled. At this point, the controller stops the boost switching transistor 116 from operating.

Figure 4:
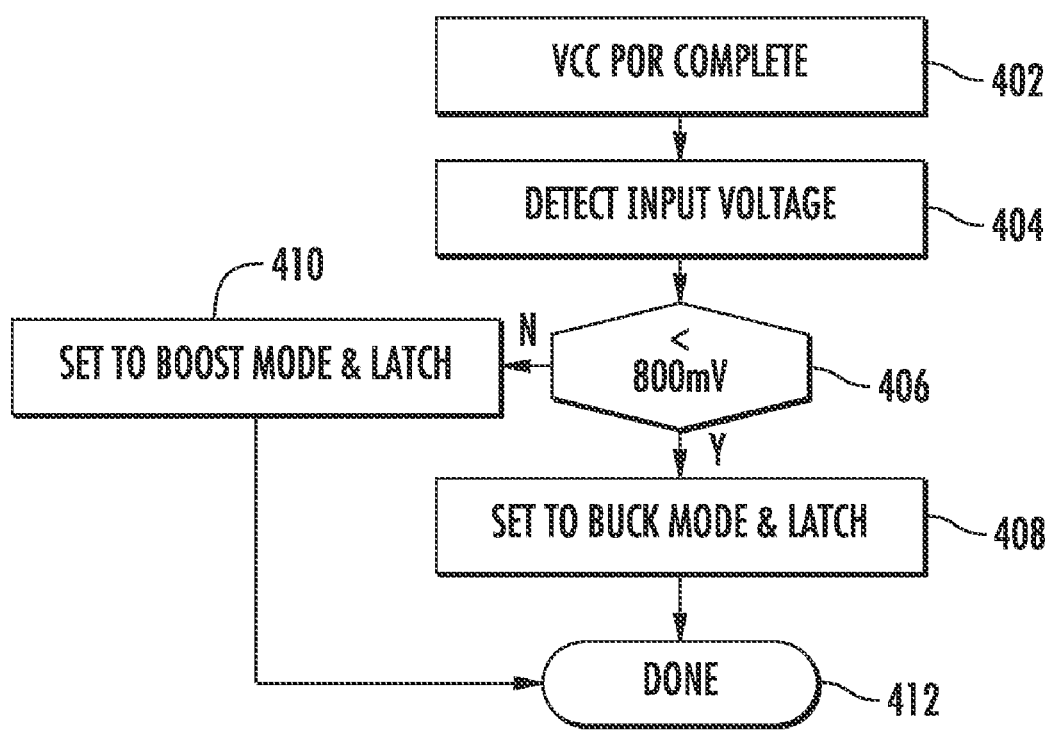
FIG. 4 is a flow diagram describing the process for latching the controller into a configured mode of operation.

Referring now to FIG. 4, there is illustrated the manner for determining the configured mode of operation of the controller 204. The $V_{IN\_}$boost pin 218 is used to set the boost mode for the controller 204. After completion of the VCC power on reset at step 402, the controller 204 detects the input voltage applied to the boost regulator at step 404. Inquiry step 406 determines if the voltage on the input pin 218 is less than 800 mV. If so, the controller 204 sets the device to operate in the buck mode of operation and latches the controller to this mode at step 408. This state will then never change. If inquiry step 406 determines that the voltage on pin 218 is greater than 200 mV, the controller sets the device to the boost mode of operation and latches it into this state at step 410.

Figure 5:
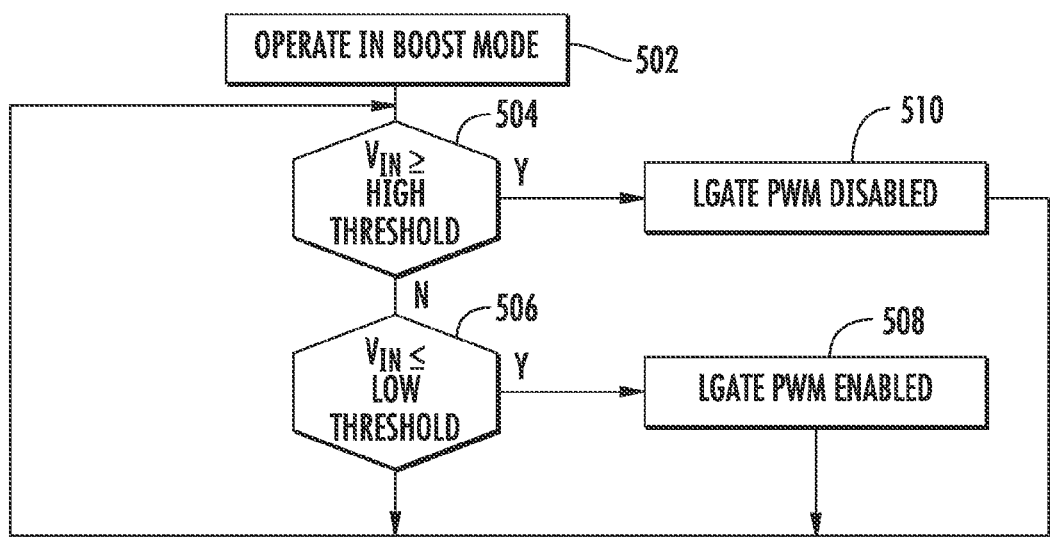
FIG. 5 is a flow diagram describing the operation of the boost mode of operation.

Referring now also to FIG. 5, there is illustrated a flow diagram describing the operation of the controller 204 when latched into the boost mode of operation. Initially, at step 502 while the controller 204 is operating in the boost mode of operation, a determination is made at inquiry step 504 by hysteresis comparator 214 as to whether the output voltage of the boost converter is greater than or equal to a high threshold voltage. If so, the lower gate PWM provided from driver 202 is disabled at step 510. If not, a second determination may be made at inquiry step 506 as to whether the output voltage of the boost converter is less than or equal to a low threshold voltage. If the output voltage is less than or equal to the low threshold voltage, the lower gate PWM signal provided by the lower gate driver 202 is enabled at step 508. If the output voltage is not less than or equal to the low threshold voltage, control returns to step 504 to continue monitoring the output voltage.

Utilizing this circuitry, a power management IC enables the low-side driver to drive a boost converter in addition to the buck converter. The above described circuitry will facilitate the implementation of a concise system design that saves costs. The IC controller will maintain vital voltage rails in the event of a critically low input voltage. From the point of view of the main circuit structure, the proposed scheme utilizes the low-side driver of the synchronous buck to drive the main boost switch. In control, the driving signal for the boost is the original signal for the sync buck high-side driving signal which is proven to be workable. The circuit also integrates the control of operation of the boost converter by monitoring the input voltage and output voltage of the boost converter. A pre-regulator is thus used and system control is simple and robust.

It will be appreciated by those skilled in the art having the benefit of this disclosure that this buck controller having integrated boost control and driver provides a device having a lower gate drive signal that may be configured to drive a switching transistor of either a buck converter or a boost converter. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An integrated circuit controller for controlling the operation of a voltage converter, comprising:

a first comparator for comparing a voltage associated with an input of a boost converter with a threshold voltage and generating a control signal in response thereto;

a second comparator for comparing a second voltage associated with an output of the boost converter with a second threshold voltage and generating a second control signal in response thereto;

driver circuitry for generating a first switching transistor drive signal and a second switching transistor drive signal, wherein the first switching transistor drive signal is used for driving an upper gate switching transistor of a buck converter and the second switching transistor drive signal may be configured in a first mode of operation to drive a lower gate switching transistor of the buck converter and may be configured in a second mode of operation to drive a switching transistor of the boost converter; and control logic for enabling/disabling at least a portion of the driver circuitry responsive to the control signal and the second control signal.

2. The integrated circuit of claim 1, wherein the driver circuitry further comprises:

a lower gate driver for generating a lower gate drive signal that is applied to the lower gate switching transistor of the buck converter in the first mode of operation and to the switching transistor of the boost converter in the second mode of operation responsive to a PWM input;

an upper gate driver for generating an upper gate drive signal that is applied to the upper gate switching transistor of the buck converter in both the first and second modes of operation responsive to the PWM input; and a PWM controller for generating the PWM input.

3. The integrated circuit of claim 2, wherein the control logic enables/disables the lower gate driver responsive to the control signal and the second control signal.

4. The integrated circuit of claim 2, wherein the control logic enables the lower gate driver when the voltage associated with the input of the boost converter is less than the threshold voltage and the voltage associated with the output of the boost converter is less than the threshold voltage.

5. The integrated circuit of claim 2, wherein the control logic disables the lower gate driver when the voltage associated with the input of the boost converter is greater than the threshold voltage.

6. The integrated circuit of claim 2, wherein the control logic disables the lower gate driver when the voltage associated with the output of the boost converter is greater than the threshold voltage.

7. The integrated circuit of claim 1, further comprising boost mode selection logic for determining whether the integrated circuit controller is in the first mode of operation or the second mode of operation after completion of a power on reset and latching the integrated circuit controller into the determined mode of operation.

8. A voltage regulation circuit, comprising:
a boost regulator circuit having an input and an output;
a buck regulator circuit having an input connected to the output of the boost regulator circuit and an output for providing a regulated output voltage;
a controller for controlling operation of the boost regulator circuit and the buck regulator circuit in a boost mode of operation and a buck mode of operation, comprising:
a first comparator for comparing a voltage associated with an input of the boost regulator circuit with a threshold voltage and generating a control signal in response thereto;
a second comparator for comparing a second voltage associated with an output of the boost regulator circuit with a second threshold voltage and generating a second control signal in response thereto;
driver circuitry for generating a first switching transistor drive signal and a second switching transistor drive signal, wherein the first switching transistor drive signal is used for driving an upper gate switching transistor of the buck regulator circuit and the second switching transistor drive signal may be configured in the buck mode of operation to drive a lower gate switching transistor of the buck regulator circuit and may be configured in the boost mode of operation to drive a switching transistor of the boost regulator circuit; and
control logic for enabling/disabling at least a portion of the driver circuitry responsive to the control signal and the second control signal.

9. The voltage regulation circuit of claim 8, further including:
a first voltage divider for providing the voltage associated with the input of the boost regulator circuit, wherein a hysteresis of the first comparator may be programmed via a top resistor of the first voltage divider; and
a second voltage divider for providing the second voltage associated with the output of the boost regulator circuit, wherein a hysteresis of the second comparator may be programmed via a top resistor of the second voltage divider.

10. The voltage regulation of claim 9, further comprising boost mode selection logic for determining whether the integrated circuit controller is in the first mode of operation or the second mode of operation after completion of a power on reset and latching the integrated circuit controller into the determined mode of operation.

11. The voltage regulation of claim 8, wherein the driver circuitry further comprises:
a lower gate driver for generating a lower gate drive signal that is applied to the lower gate switching transistor of the buck regulator circuit in the first mode of operation and to the switching transistor of the boost converter in the second mode of operation responsive to a PWM input;
an upper gate driver for generating an upper gate drive signal that is applied to the upper gate switching transistor of the buck regulator circuit in both the first and second modes of operation responsive to the PWM input; and
a PWM controller for generating the PWM input.

12. The voltage regulation of claim 11, wherein the control logic enables the lower gate driver when the voltage associated with the input of the boost regulator circuit is less than the threshold voltage and the voltage associated with the output of the boost regulator circuit is less than the threshold voltage.

13. The voltage regulation of claim 11, wherein the control logic disables the lower gate driver when the voltage associated with the input of the boost regulator circuit is greater than the threshold voltage.

14. The voltage regulation of claim 11, wherein the control logic disables the lower gate driver when the voltage associated with the output of the boost regulator circuit is greater than the threshold voltage.

15. The voltage regulation of claim 11, wherein the control logic enables/disables the lower gate driver responsive to the control signal and the second control signal.

16. A method for controlling the operation of a voltage converter, comprising the steps of:
comparing a voltage associated with an input of a boost converter with a threshold voltage;
generating a control signal responsive to the comparison with the input of the boost converter;
comparing a second voltage associated with an output of the boost converter with the threshold voltage;
generating a second control signal responsive to the comparison with the output of the boost converter;
generating a first switching transistor drive signal and a second switching transistor drive signal;
driving an upper gate switching transistor of a buck converter using the first switching transistor drive signal and a lower gate switching transistor of the buck converter using the second switching transistor signal in a buck mode of operation;
driving the upper gate switching transistor of the buck converter using the first switching transistor drive signal and a switching transistor of a boost converter using the second switching transistor signal in a boost mode of operation;
enabling the second switching transistor drive signal responsive to the control signal and the second control signal; and
disabling the second switching transistor drive signal responsive to the control signal and the second control signal.

17. The method of claim 16, wherein the step of enabling further comprises the step of enabling the second switching transistor drive signal when the voltage associated with the input of the boost converter is less than the threshold voltage and the voltage associated with the output of the boost converter is less than the threshold voltage.

18. The method of claim 16, wherein the step of disabling further comprises the step of disabling the second switching transistor drive signal when the voltage associated with the input of the boost converter is greater than the threshold voltage.

19. The method of claim 16, wherein the step of disabling further comprises the step of disabling the second switching transistor drive signal when the voltage associated with the output of the boost converter is greater than the threshold voltage.

20. The method of claim 16, further comprising the steps of:
   determining whether the voltage converter is in the buck mode of operation or the boost mode of operation after completion of a power on reset; and
   latching a controller of the voltage converter into the determined mode of operation.

* * * * *